United States Patent [19]

Lee

[11] 4,380,887

[45] Apr. 26, 1983

[54] INSULATED STRUCTURAL BLOCK

[76] Inventor: Kenneth S. Lee, 1711 Palomar, Ann Arbor, Mich. 48103

[21] Appl. No.: 194,018

[22] Filed: Oct. 6, 1980

[51] Int. Cl.³ .......................... E04C 1/40; E04B 2/00
[52] U.S. Cl. .................................. 52/405; 52/309.4; 52/505; 52/606; 52/809
[58] Field of Search ................. 52/405, 309.4, 309.12, 52/505, 606, 809

[56] References Cited

U.S. PATENT DOCUMENTS

| | | | |
|---|---|---|---|
| 3,204,381 | 9/1965 | Perreton | 52/309.12 |
| 3,992,838 | 11/1976 | Vizziello | 52/309.4 |
| 4,016,693 | 4/1977 | Warren | 52/405 |
| 4,123,881 | 11/1978 | Muse | 52/309.12 |
| 4,185,434 | 1/1980 | Jones | 52/405 |

FOREIGN PATENT DOCUMENTS

| | | | |
|---|---|---|---|
| 10238 | 4/1980 | European Pat. Off. | 52/405 |
| 1014474 | 8/1957 | Fed. Rep. of Germany | 52/606 |
| 1171593 | 6/1964 | Fed. Rep. of Germany | 52/606 |
| 141677 | 8/1953 | Sweden | 52/405 |

*Primary Examiner*—J. Karl Bell
*Attorney, Agent, or Firm*—James M. Deimen

[57] ABSTRACT

The invention comprises an insulated structural block for masonry construction formed to accept rigid insulating foam insert panels and shaped to minimize the transfer of heat by conduction through the block webs from the exterior to the interior of a structure. The foam inserts are preferably located adjacent the exterior face of the block. This permits the portion of the block on the interior side of the foam inserts to act as a thermal mass for passive solar heating and cooling applications. The blocks may be formed in a conventional block making machine by utilizing a modified mold or in a modified block making machine.

The block making mold is configured to hold at least one foam insert in place as the block material is poured into the mold. The foam insert forms slots in the block webs to reduce the conduction of heat through the webs. Additional slots are formed by the mold to reduce conduction of heat through the webs and to permit the insertion of a second layer of foam insulation in the block.

Alternatively, the block making mold may be configured to form the block with all the recesses and slots necessary for the foam inserts, the foam inserts all being inserted after the blocks are cured or fired depending on the block material.

23 Claims, 24 Drawing Figures

INSULATED STRUCTURAL BLOCK

BACKGROUND OF THE INVENTION

The field of the invention pertains to structural blocks such as those commonly referred to as "concrete blocks" used for constructing both load bearing and non-load bearing walls of buildings. Such blocks are usually formed with two or three vertical holes formed therein and made of concrete or cinders with a cement mortar as a binder. Less commonly the blocks may be constructed of fired brick or clay tile.

The holes in the blocks provide a substantial decrease in weight and material without a commensurate decrease in structural strength. The holes also provide some insulating value as closed airspace in a completed wall. More recently semi-cylindrical inserts formed of rigid foam are being inserted into the holes of conventionally manufactured blocks after the blocks are molded and cured or fired. The inserts partially fill the holes in the blocks. Such inserts, however, do not decrease the thermal conduction through the interior webs joining the exterior and interior faces of the blocks together. Other approaches include filling of the holes with foam or other insulating material to decrease the heat transfer effect of thermal convection within the holes or the construction of walls with parallel rows of blocks separated by a layer of insulation.

SUMMARY OF THE INVENTION

The invention comprises an insulated structural block for masonry construction formed to accept rigid insulating foam insert panels. The panels may be coated with a heat reflective surface to further enhance the thermal resistance of the blocks. The block body is shaped to minimize the transfer of heat by conduction through the block from the exterior to the interior of a structure. The block, however, retains the vertical load carrying capacity of a conventional block.

The reduction in conductive heat transfer is accomplished by providing a lengthier path for heat transfer through the webs joining the faces of the block together. The web cross-sectional area is also decreased by notches or slots formed in the webs. Some of the slots retain the foam inserts in proper position within the blocks. Preferably the foam inserts are located adjacent the exterior face of the block. This permits the portion of the block on the interior side of the foam inserts to act as a thermal mass for passive solar heating and cooling applications.

The blocks may be formed in a conventional block making machine by utilizing a modified mold or in a modified block making machine. The mold is configured to hold at least one foam insert in place as the block material is poured into the mold. Thus, the foam insert serves as a portion of the mold and shapes the block webs in accordance with the invention.

Alternatively, the block making mold may be configured to form the block with all the recesses and slots necessary for the foam inserts, the foam inserts all being inserted afer the blocks are cured or fired depending upon the block material.

DESCRIPTION OF THE DRAWINGS

FIG. 21 is an exploded perspctive view of a mold for the structural block of FIG. 12;

FIG. 22 is a top view of the mold of FIG. 21 positioned for ejection of the block; and, FIG. 23 is a top view of the mold of FIG. 21 positioned for filling of the mold with block mixture.

DESCRIPTION OF THE PREFERRED EMBODIMENTS

In FIGS. 1 through 7 the structural block comprises a body 10 formed of a concrete mixture and a plurality of insulating inserts 12, 14 and 16 formed of rigid insulating foam. In the nominal 16 inch by 12 inch by 8 inch size block commonly used in the United States for exterior wall construction, a suitable foam insert thickness for each insert is from 1 to 2 inches. The foam insert thickness, however, is not limited to this range but may be thicker or thinner as required.

Figure 1A:
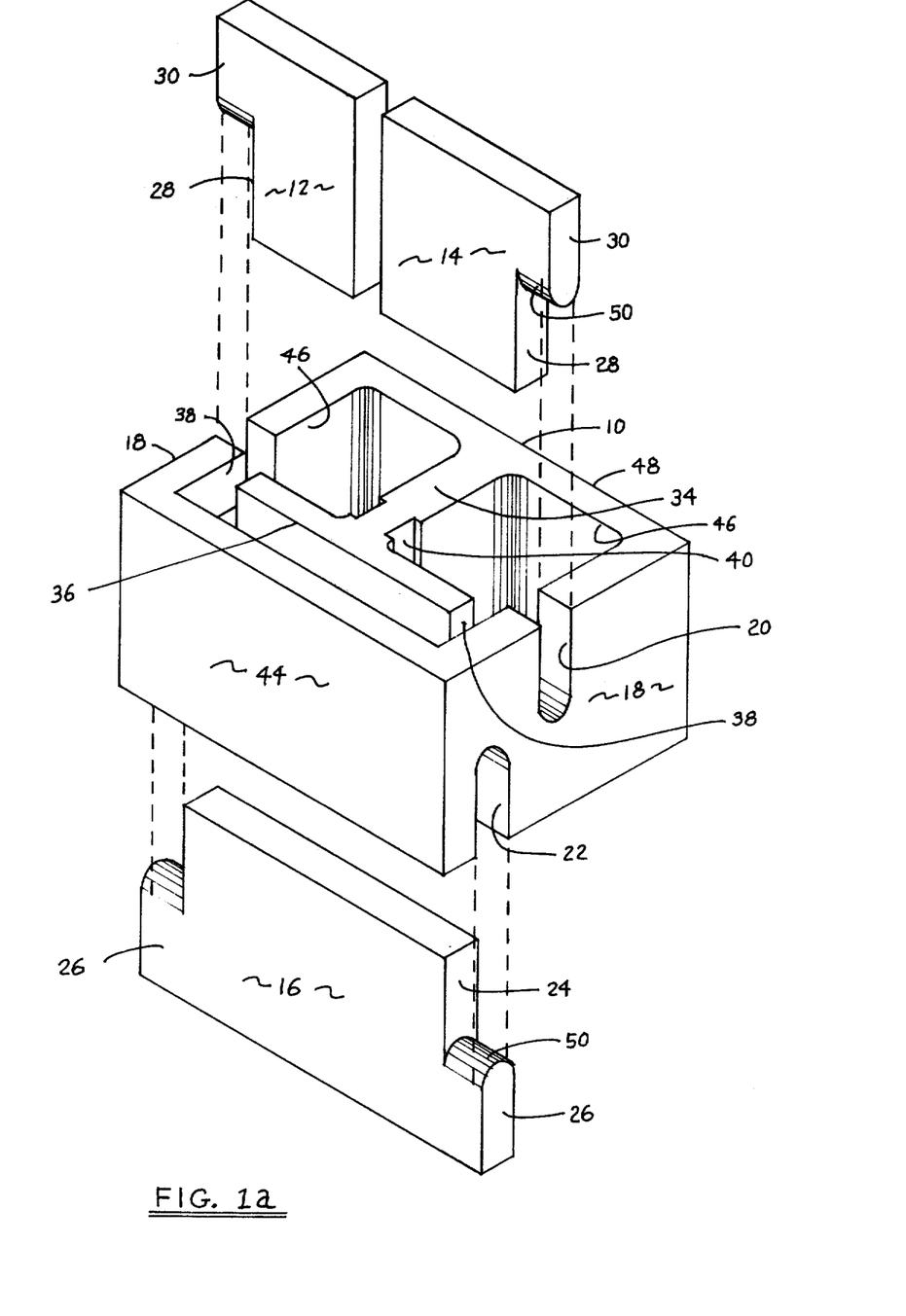
FIG. 1a is an exploded perspective view of a structural block according to the invention.
Figure 1B:
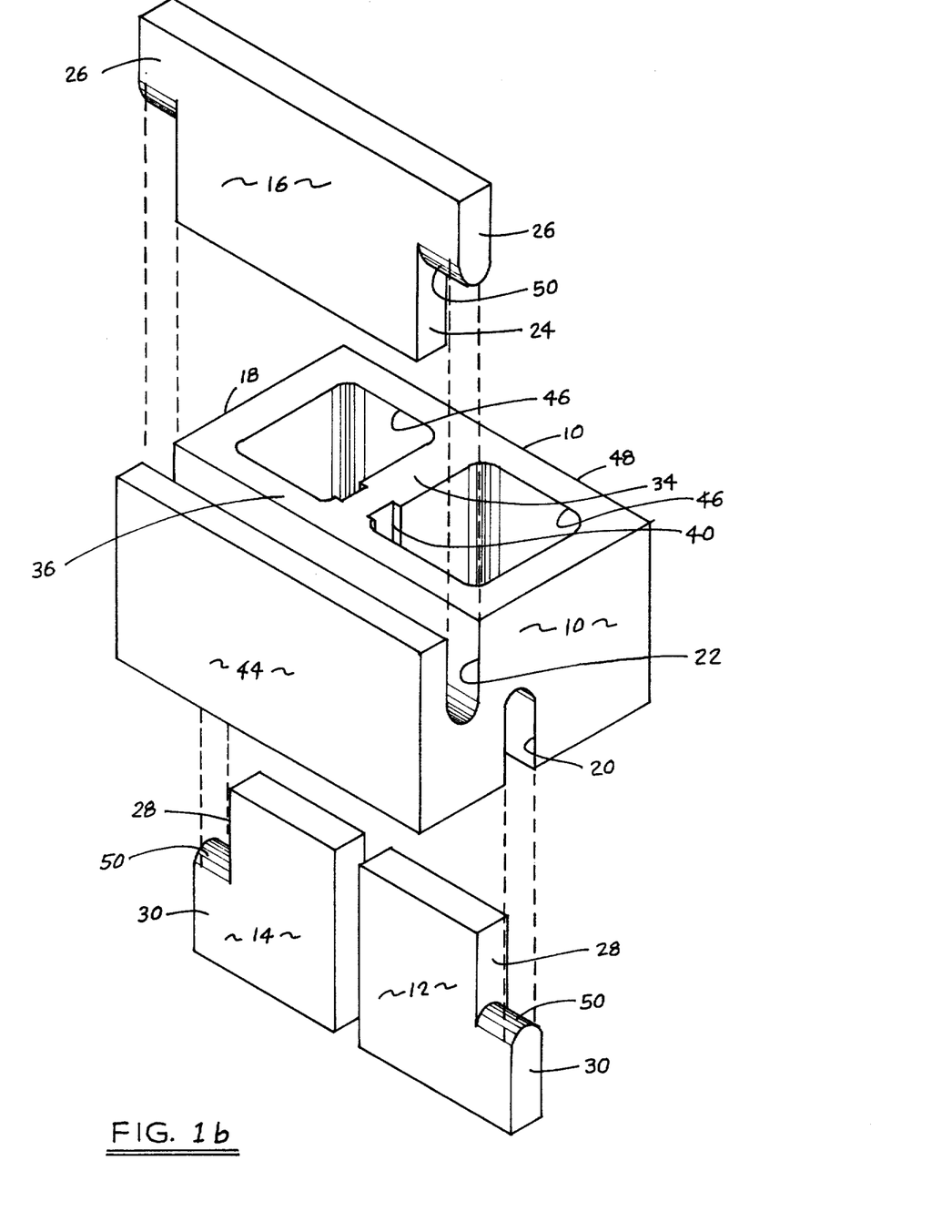
FIG. 1b is an exploded perspective view of the structural block from underneath.
Figure 2:
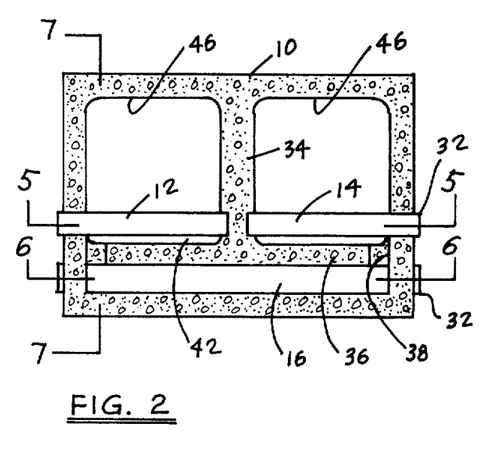
FIG. 2 is a top view of the structural block.
Figure 3:
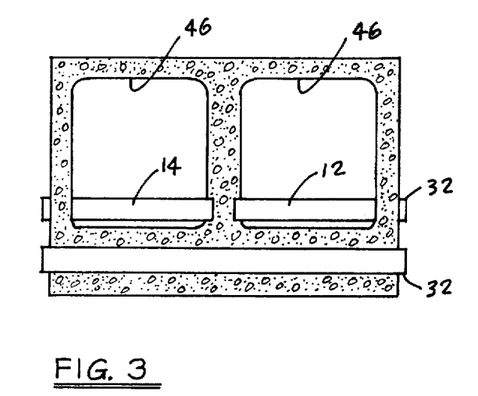
FIG. 3 is a bottom view of the structural block.
Figure 4:
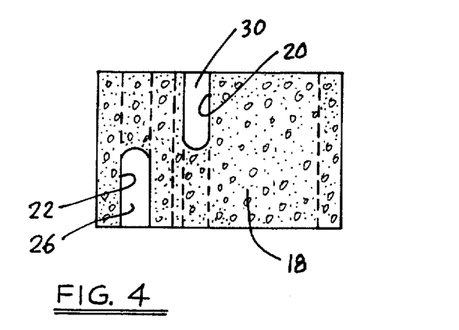
FIG. 4 is an end view of the structural block.
Figure 5:
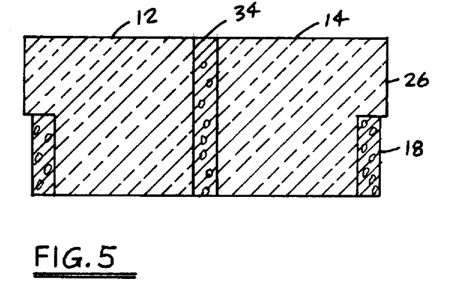
FIG. 5 is a cross-section of the block taken long the line 5—5 in FIG. 2.
Figure 6:
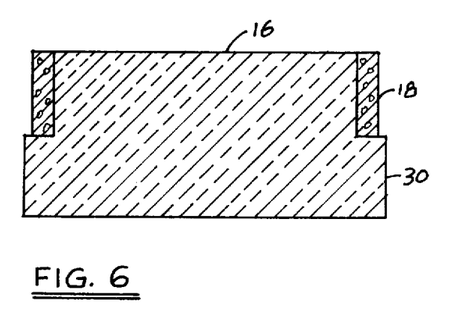
FIG. 6 is a cross-section of the block taken along the line 6—6 in FIG. 2.
Figure 7:
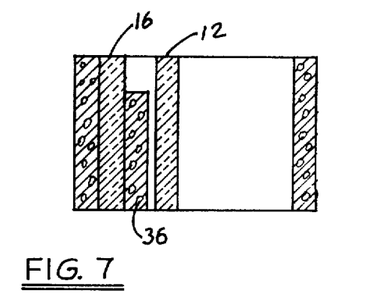
FIG. 7 is a cross-section of the block taken along the line 7—7 in FIG. 2.

Each end wall or web 18 of the block is slotted substantially one-half or more of the block height from the top at 20 and from the bottom at 22. The foam insert 16 is correspondingly notched at 24 at each end to permit extensions 26 to fit into the bottom notches 22. Similarly, the foam inserts 12 and 14 are also notched at 28 to permit extensions 30 to fit into the top notches 20. As shown in FIGS. 2 and 3 the extensions 26 and 30 preferably protrude approximately ⅛ inches to ¼ inches beyond the block end webs 18 as indicated at 32. Thus, as the blocks are laid end to end, the insulating inserts can be brought into contact therebetween with the conventional ¼ inches to ⅜ inches mortar joint between the blocks on each side of the block wall. The contact provides a guide to control the mortar joint thickness.

The foam inserts 12, 14 and 16 may be constructed of rigid foamed polyurethane, polystyrene or any other suitable sufficiently rigid insulating material. As an option the large vertical surfaces of the foam inserts may be covered with a heat reflective coating such as aluminized paper or paint.

The block body 10 includes several features to reduce the thermal conduction horizontally therethrough. Firstly, the block end web 18 cross-section is effectively reduced by one-half at the locations of the slots 20 and 22. Secondly, the central web 34 ends at a cross-wise web 36 which in turn includes slots 38. The thermal path through the central web 34 is substantially extended and requires the flow of heat by conduction therethrough to first pass through the end webs 18 including the reduced cross-section adjacent the slot 20 or the slot 22 depending on the direction of horizontal heat flow through the block wall. The slots 38 reduce the effective cross-sectional area of the cross-wise web 36 further impeding the flow of heat through web 34. The cross-wise web 36 provides additional vertical load carrying capacity to more than compensate for the small loss of vertical load capacity caused by the slots 20 and 22 and the foreshortened center web 34. The block thereby retains the vertical load capacity of a conventional block but simultaneously reduces the horizontal heat transfer capability through the block material. Slots 40 are formed in the central web 34 to retain the insulating foam inserts 12 and 14 in place. These slots also reduce the effective cross-sectional area of web 34.

As best shown in FIGS. 2 and 3 small air gaps 42 are provided adjacent the cross-wise web 36. The block is configured with the insulating inserts 12, 14 and 16 located adjacent face 44 of the block body 10 thereby providing substantially larger air gaps or holes 46 adjacent the face 48 of the block body. By constructing the block wall with face 44 on the exterior of the structure, the portion of the block between the inserts 12 and 14 and the interior face 48 becomes a more effective heat storage mass and thereby reduces the thermal fluctuation of the interior wall surface as the exterior wall temperature changes.

To further enhance the thermal storage capacity of the block wall, the holes 46 behind the inserts 12 and 14 will be filled with loose sand or with concrete as the wall is constructed.

The blocks may be formed by inserting one or more of the insulating foam inserts into a specially configured mold before the concrete or cinder mix is added. Alternatively, the block may be formed in a properly configured mold and cured before the inserts are positioned in the block. The latter method is required where the blocks are fired such as brick or tile blocks. Returning to FIGS. 1a and 1b, the foam inserts 12, 14 and 16 include convex shoulders 50 on the extensions 26 and 30. These rounded shoulders 50 assist the concrete or cinder mix in flowing under and about the extensions as the block is formed and compacted in the mold. Alternatively, the shoulders may be flat or of another shape to assist the flow of the mix, however, a rounded shape provides the best combination to assist the flow of the concrete mix and provide maximum structural integrity in the completed block.

Figure 8:
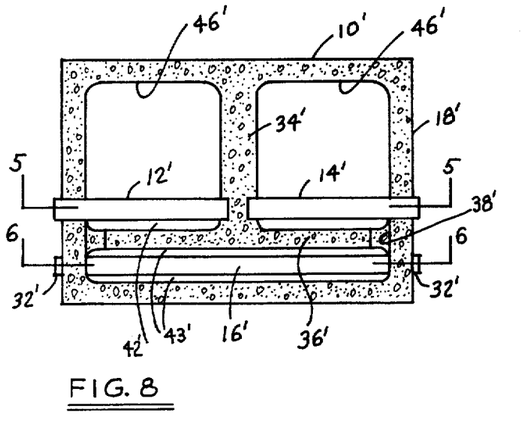
FIG. 8 is a top view of an alternate form of the structural block.
Figure 9:
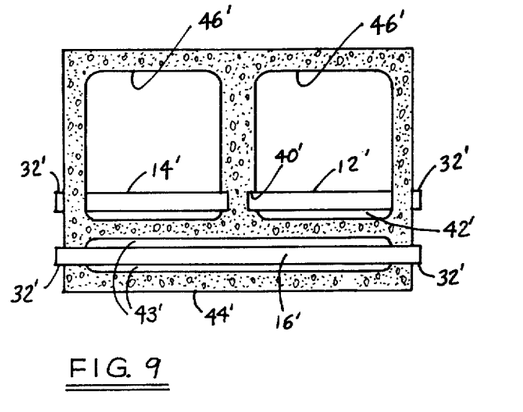
FIG. 9 is a bottom view of the structural block of FIG. 8.

In FIGS. 8 and 9 an alternative form of the block 10' is shown. The block 10' retains the same basic configuration with insulating foam inserts 12', 14' and 16' extending at 32' beyond the end webs 18' and the slots 40'.

The slots 38' are retained in cross-wise web 36', however, the insert 16' is spaced from both the cross-wise web 36' and the exterior face 44'. The spacing provides two additional air gaps 43' in the block 10' and allows the insert 16' to be easily inserted into the block in cases where the block is cured prior to insertion of the inserts. The block 10' provides four separate air gaps or holes 42', 43' and 46' in the horizontal direction from face 44' to face 48' for enhanced resistance to heat transfer by convection within the block.

Figure 10:
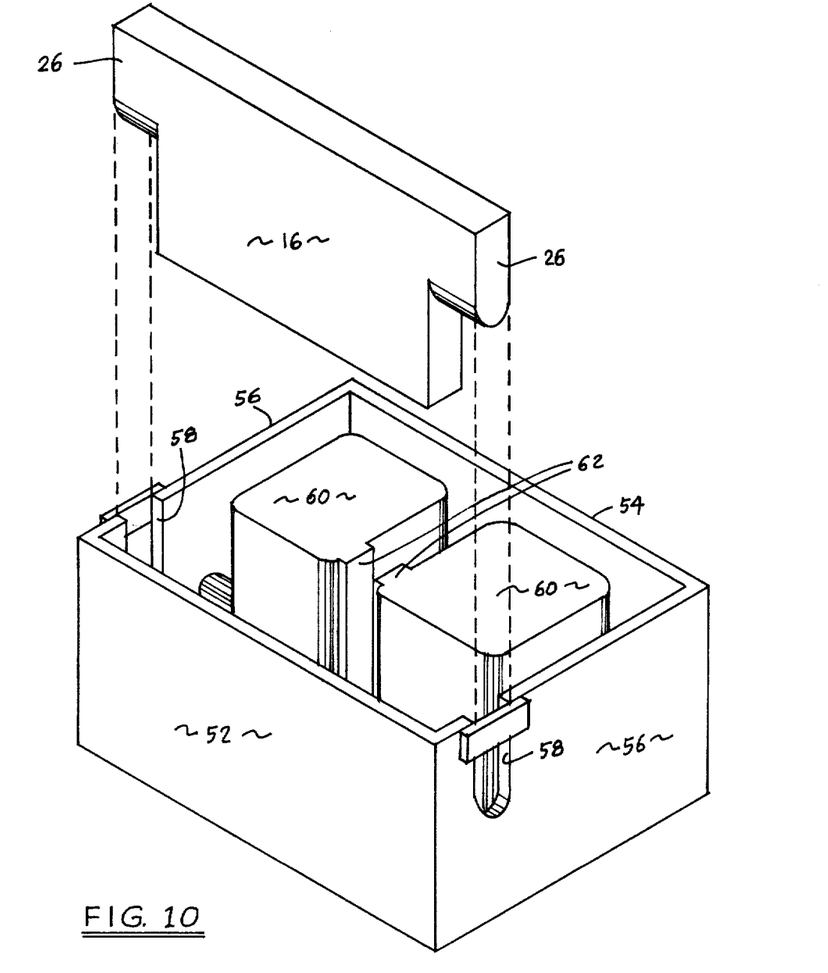
FIG. 10 is a perspective view of a mold for the structural block of FIG. 1.
Figure 11:
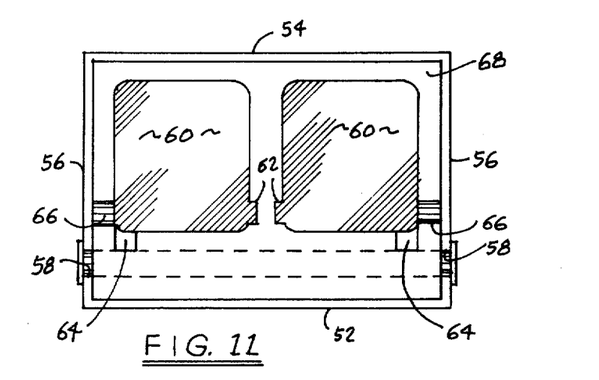
FIG. 11 is a top view of the mold of FIG. 10.
Figure 12:
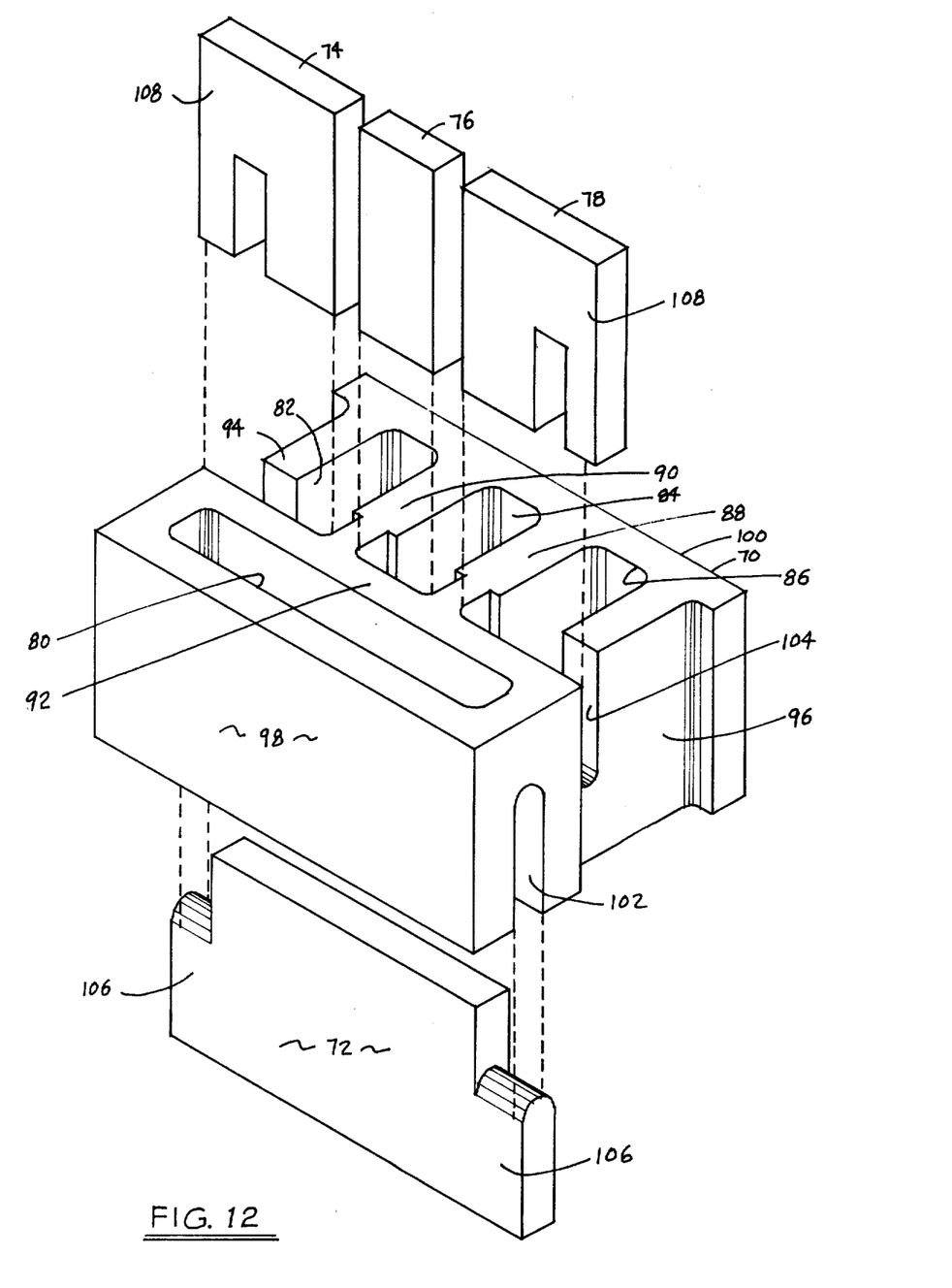
FIG. 12 is an exploded perspective view of a second alternate form of the structural block.
Figure 13:
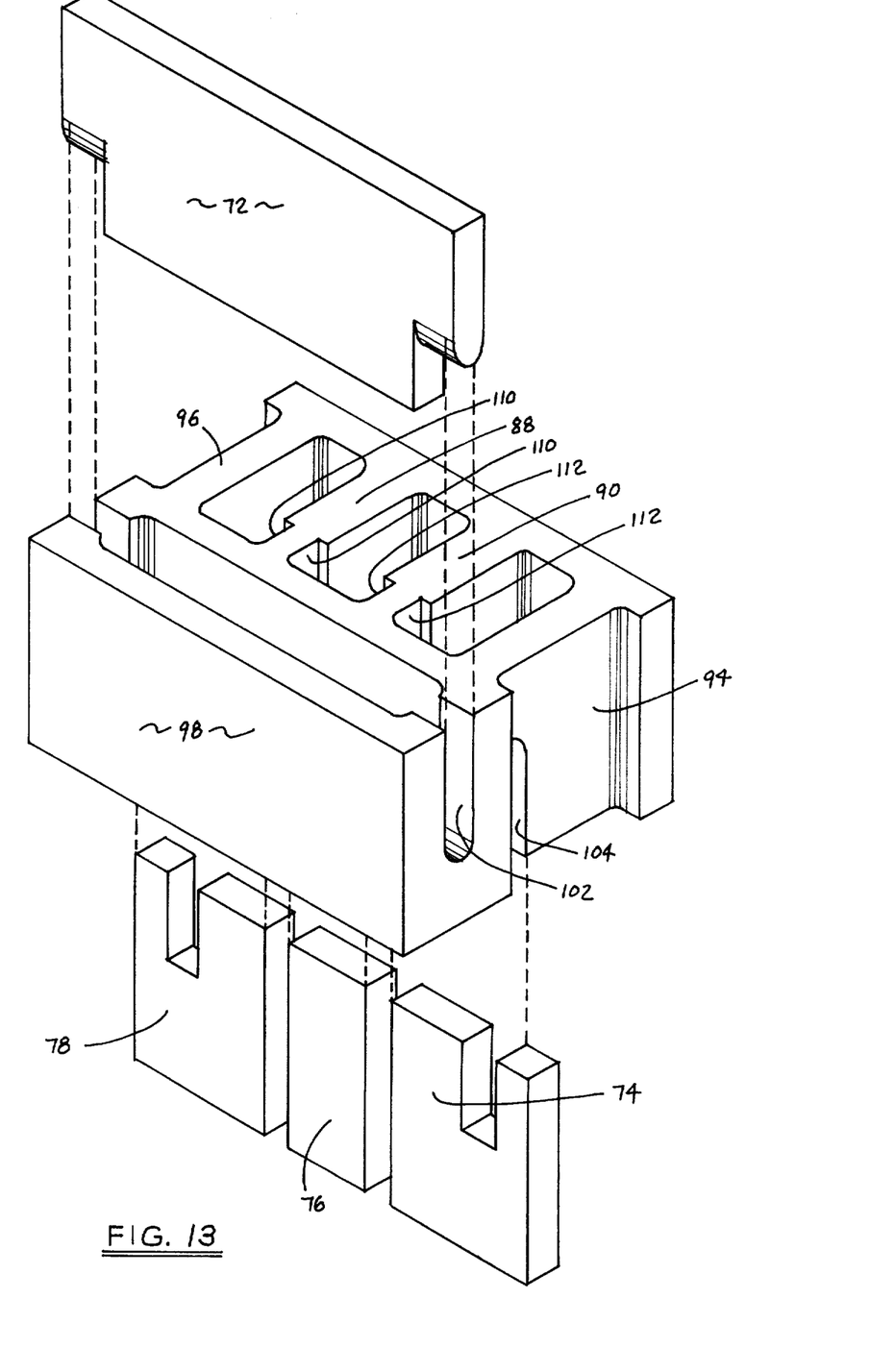
FIG. 13 is an exploded perspective view of the structural block of FIG. 12 from underneath.

The blocks are manufactured by forming the blocks in a conventional concrete block making machine with a specially modified mold to provide the configuration required by the slots and cross-wise web. An example of such a mold is shown in FIGS. 10 and 11 for the manufacture of the block shown in FIGS. 1a and 1b. The block is formed with foam insert 16 in place. After steam curing of the block, foam inserts 12 and 14 are inserted into the holes 46 of the block.

The block mold comprises a rectangular shell having a front 52, back 54 and ends 56. The ends 56 each include a slot 58 sized to accept the extensions 26 of insert 16, in particular, the portion 32 of the extensions that protrudes from the ends of the block 10. Within the mold cavity are two upstanding cores 60 each shaped at 62 to form the slots 40 as well as the holes 46 and air gaps 42. Extending from the cores adjacent the bottom are shapes 64 to form the slots 38 and shapes 66 to form the slots 20 in the block.

The base plate 68 upon which the block rests is mechanically separate from the portions of the mold described above. The base plate 68 typically is mounted upon a hydraulic actuator that permits the block to be upwardly ejected from the mold after filling and compacting. Alternatively, the mold may be hydraulically raised from the block and base plate or the block and base plate lowered from the mold. The freshly compacted block upon ejection is removed with the base plate 68 and a replacement base plate inserted in the mold for the next block. The blocks remain on the base plates until cured.

The base plate 68 for this particular configuration includes gaps to clear all portions of the core 60 including the shapes 66 that extend to the ends 56. As an alternative, however, the base plate could be constructed to include the shapes 64 and 66 thereby providing a more rigid base plate. To prevent soaking of the insulation by steam condensation during curing, the insert 16 is formed from a foam that does not absorb moisture in significant amounts such as polystyrene.

In FIGS. 12 through 19 another form of the block 70 is shown with four insulating foam insert panels 72, 74, 76 and 78 insertable into four holes 80, 82, 84 and 86 respectively. Two interior webs 88 and 90 terminate at a cross-web 92 which in turn extends between th end webs 94 and 96 and parallel to the block faces 98 and 100. The end webs 94 and 96 include deep slots 102 and 104. The extensions 106 on panel 72 pass through the slots 102 and extend slightly therebeyond as above. The extensions 108 of the end panels 74 and 78 likewise extend through the slots 104. The interior webs 88 and 90 include vertical slots 110 and 112 respectively to properly position the panels 74, 76 and 78.

Figures 14, 15, 16, 17, 18:
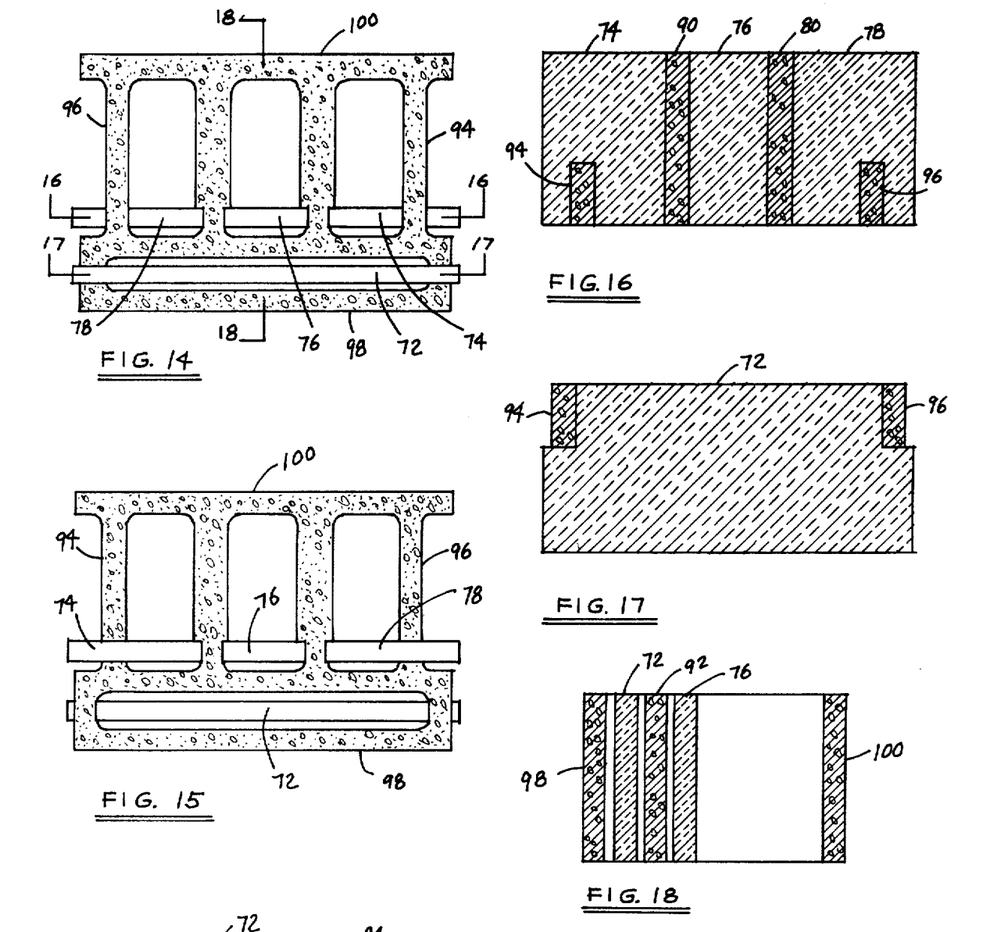
FIG. 14 is a bottom view of the structural block of FIG. 12.
FIG. 15 is a top view of the structural block of FIG. 12.
FIG. 16 is a cross-section of the block taken along the line 16—16 in FIG. 14.
FIG. 17 is a cross-section of the block taken along the line 17—17 in FIG. 14.
FIG. 18 is a cross-section of the block taken along the line 18—18 in FIG. 14.
Figure 19:
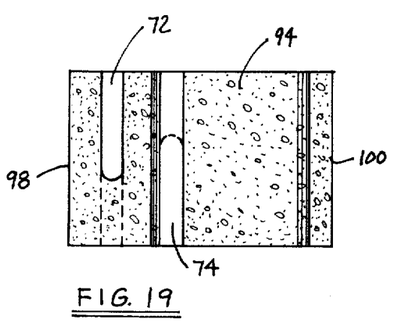
FIG. 19 is an end view of the block of FIG. 12.

As is clearly shown in FIGS. 16, 17 and 19, the slots 102 and 104 extend substantially deeper than one-half the height of the block 70 thereby further reducing the condition of heat horizontally through the block end webs 94 and 96. The basic lateral strength of the block is retained by the provision of the dual interior webs 88 and 90 and the cross-web 92.

Figure 20:
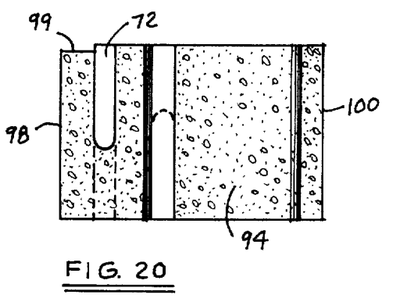
FIG. 20 is an end view of the block of FIG. 12 showing a modification thereof.

In FIG. 20 the front face 98 of the block is shorter than the height of the remainder of the block as indicated at 99. These blocks as modified in FIG. 20 may be laid up with the front faces non-loadbearing thereby diminishing any strain on the reduced section of the end webs 94 and 96 at the slots 102.

Figures 21, 22, 23:
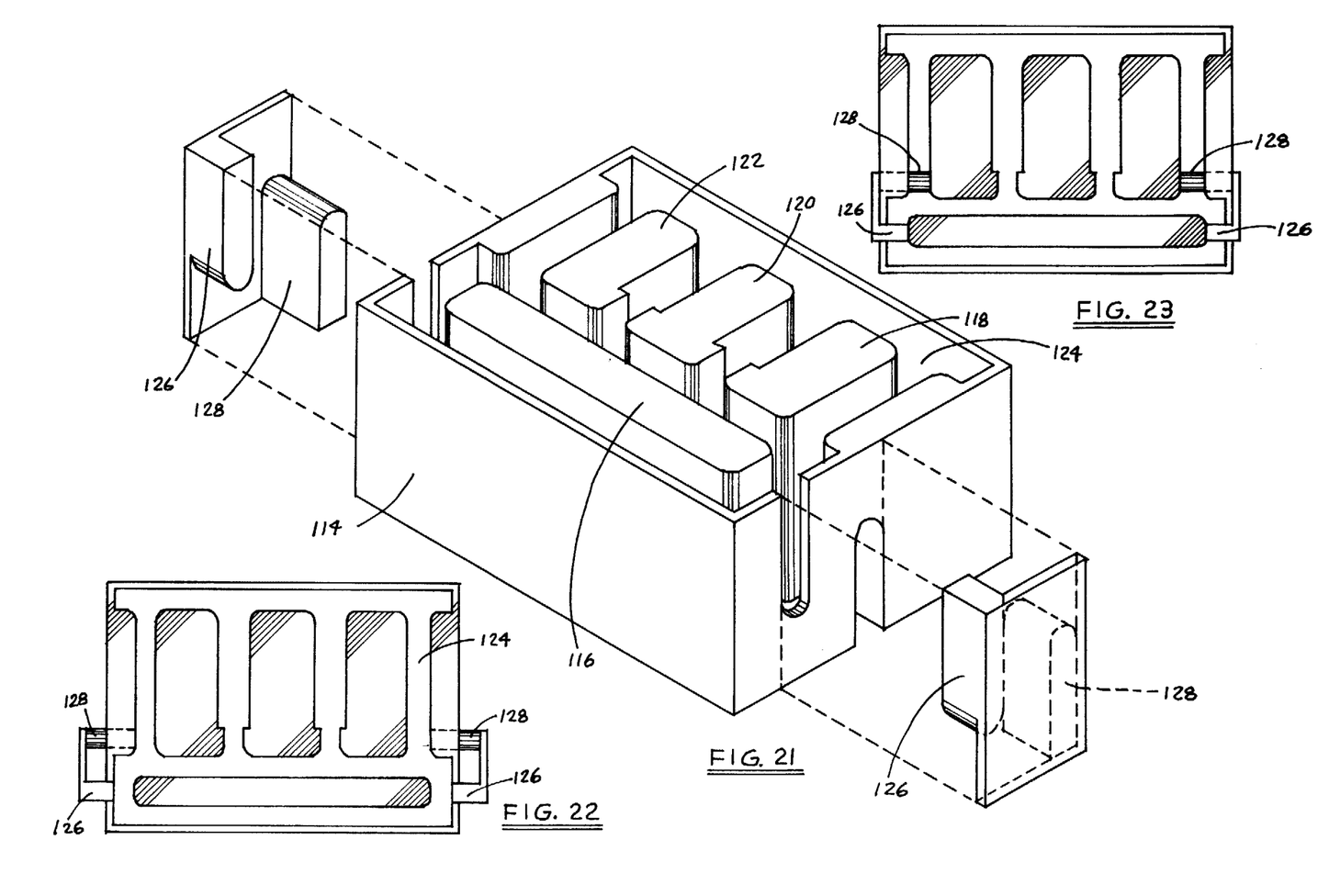

In FIGS. 21 through 23 a mold for the block 70 is shown. The mold 114 includes a plurality of cores 116, 118, 120 and 122 located in the mold cavity 124 to form the holes 80, 82, 84 and 86 respectively. The end wall slots 102 and 104 are formed by plugs 126 and 128 that are horizontally movable. The plugs 126 and 128 are inserted into the mold cavity 124 before the block mix is poured into the mold as shown in FIG. 23. Before the block is ejected from the mold the plugs 126 and 128 are retracted from the mold as shown in FIG. 22.

I claim:

1. In a structural block having a plurality of holes extending therethrough defined by webs and faces of the block,
   one of said webs comprising a cross-wise web extending substantially parallel to the faces of the block,
   two of said webs substantially adjacent the ends of the block, extending between the faces of the block and joining the cross-wise web to said faces,
   at least one interior web joining the cross-wise web to one of said faces, said interior web extending the full height of the block from the cross-wise web to the one face,
   said webs adjacent the ends of said block each formed with at least one horizontal slot extending through the web, and,
   horizontal slots in the cross-wise web adjacent the end webs.

2. The block of claim 1 wherein at least one end web includes a slot extending downwardly from the top of the block and a second slot extending upwardly from the bottom of the block.

3. The block of claim 1 wherein at least one insulating foam panel extends substantially the length of the block.

4. The block of claim 1 including at least two substantially parallel foam panels.

5. The block of claim 1 including two insulating foam panels separated by the cross-wise web.

6. The block of claims 1 or 5 including an air gap located between at least two foam panels.

7. The block of claims 1 or 2 wherein slots in the end webs extend substantially one-half the height of the block.

8. The block of claim 1 including at least one vertical slot in an interior web.

9. The block of claim 3 wherein the foam panel extends through and beyond the end webs.

10. The block of claim 1 wherein two slots are formed in an end web and at least two separate insulating foam panels extend through and beyond the end web.

11. The block of claim 10 including a vertical slot in an interior web and at least one foam panel engaging the interior web in said slot.

12. In a structural block having a plurality of holes extending therethrough defined by webs and faces of the block,
    one of said webs comprising a cross-wise web extending substantially parallel to the faces of the block,
    two of said webs substantially adjacent the ends of the block, extending between the faces of the block and joining the cross-wise web to said faces,
    at least one interior web joining the cross-wise web to one of said faces, said interior web extending the full height of the block from the cross-wise web to the one face and formed with at least one vertical slot extending the full height of the block, and,
    said webs adjacent the ends of said block each formed with at least one horizontal slot extending through the web.

13. The structural block of claim 12 including an insulating foam panel located between the cross-wise web and one face of the block, and extending through at least one of said horizontal slots in an end web.

14. The structural block of claim 13 wherein the foam panel extends substantially the length of the block.

15. The structural block of claim 13 wherein the foam panel engages the vertical slot in an interior web and extends through the slot in an end web of the block.

16. The structural block of claim 12 including at least two insulating foam panels located substantially parallel to and on either side of the cross-wise web, said panels extending through horizontal slots in one of said end webs.

17. The structural block of claim 12 or 13 wherein at least one horizontal slot is formed in the cross-wise web of the block.

18. The structural block of claim 17 wherein insulating foam panels engage vertical and horizontal slots in said webs with the exception of the slots in said cross-wise web.

19. The structural block of claim 12 wherein all interior webs of the block extend from the cross-wise web to one face only.

20. The structural block of claim 19 wherein the end web slots extend approximately one-half the height of the block.

21. The structural block of claims 19 or 20 including at least one insulating foam panel extending substantially parallel to the faces of the block.

22. The structural block of claim 21 wherein the insulating foam panel extends through and beyond at least one end web of the block.

23. The structural block of claim 12, 13, 16 or 19 wherein the height of one face is less than the height of the other face of the block.

* * * * *